(12) United States Patent
Jurik et al.

(10) Patent No.: US 10,371,956 B2
(45) Date of Patent: *Aug. 6, 2019

(54) HOMOGENIZATION SYSTEM FOR AN LED LUMINAIRE

(71) Applicant: Robe Lighting s.r.o., Roznov pod Radhostem (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 16/153,313

(22) Filed: Oct. 5, 2018

(65) Prior Publication Data

US 2019/0155041 A1 May 23, 2019

Related U.S. Application Data (63) Continuation of application No. 15/823,215, filed on Nov. 27, 2017, now Pat. No. 10,133,080, which is a
(Continued)

(51) Int. Cl.
*F21V 9/08* (2018.01)
*F21V 21/30* (2006.01)
(Continued)

(52) U.S. Cl.
CPC .............. *G02B 27/141* (2013.01); *F21V 9/08* (2013.01); *F21V 21/30* (2013.01);
(Continued)

(58) Field of Classification Search
CPC ......... G02B 27/141; F21V 9/08; F21V 21/30; F21Y 2105/12; F21Y 2105/18;
(Continued)

(56) References Cited

U.S. PATENT DOCUMENTS

| 4,386,848 A | 6/1983 | Clendenin et al. |
| 9,885,461 B2 * | 2/2018 | Jurik ........................ F21V 21/30 |

(Continued)

FOREIGN PATENT DOCUMENTS

| CN | 1517783 A | 8/2004 |
| CN | 101189543 A | 5/2008 |

(Continued)

OTHER PUBLICATIONS

Jurik, Pavel, et al.; U.S. Appl. No. 14/155,178, filed Jan. 14, 2014; Title: Homogenization System for an LED Luminaire; 25 pages.
(Continued)

*Primary Examiner* — Mary Ellen Bowman
(74) *Attorney, Agent, or Firm* — Conley Rose, P.C.; Grant Rodolph; Brooks W Taylor (57) ABSTRACT

A remotely directable luminaire with an improved color LED homogenization system for LED luminaires employing a plurality of LED arrays where an array employs a plurality of discrete peak LED groups and dichroic mirrors maximized for transmission/reflection of around the groups of LED's discrete peaks to generate a directional homogenized color light beam with additive color mixing.

20 Claims, 12 Drawing Sheets

Related U.S. Application Data continuation of application No. 14/682,853, filed on Apr. 9, 2015, now Pat. No. 9,885,461, which is a continuation-in-part of application No. 14/155,178, filed on Jan. 14, 2014, now abandoned.

(60) Provisional application No. 61/752,006, filed on Jan. 14, 2013.

(51) Int. Cl.
| | |
|---|---|
| *G02B 27/14* | (2006.01) |
| *F21W 131/40* | (2006.01) |
| *F21Y 105/12* | (2016.01) |
| *F21Y 105/18* | (2016.01) |
| *F21Y 113/13* | (2016.01) |
| *F21Y 115/10* | (2016.01) |
| *F21W 131/406* | (2006.01) |

(52) U.S. Cl.
CPC ... *F21W 2131/40* (2013.01); *F21W 2131/406* (2013.01); *F21Y 2105/12* (2016.08); *F21Y 2105/18* (2016.08); *F21Y 2113/13* (2016.08); *F21Y 2115/10* (2016.08)

(58) Field of Classification Search
CPC ............. F21Y 2113/13; F21Y 2115/10; F21W 2131/40; F21W 2131/406
See application file for complete search history.

(56) References Cited

U.S. PATENT DOCUMENTS

| | | | |
|---|---|---|---|
| 10,133,080 B2* | 11/2018 | Jurik | ............ F21V 21/30 |
| 2012/0153852 A1 | 6/2012 | Zhang et al. | |
| 2014/0204586 A1 | 7/2014 | Roberge et al. | |

FOREIGN PATENT DOCUMENTS

| | | |
|---|---|---|
| CN | 101988631 A | 3/2011 |
| CN | 102518964 A | 6/2012 |
| CN | 102792094 A | 11/2012 |
| EP | 2461087 A1 | 6/2012 |
| WO | 2006129220 A1 | 12/2006 |
| WO | 2011112914 A2 | 9/2011 |
| WO | 2012176117 A1 | 12/2012 |

OTHER PUBLICATIONS

Notice of Allowance dated May 12, 2016; U.S. Appl. No. 14/682,853, filed Apr. 9, 2015; 8 pages.
Notice of Allowance dated May 19, 2017; U.S. Appl. No. 14/682,853, filed Apr. 9, 2015; 8 pages.
Corrected Notice of Allowance dated Aug. 25, 2017; U.S. Appl. No. 14/682,853, filed Apr. 9, 2015; 5 pages.
Office Action dated Jan. 11, 2018; U.S. Appl. No. 15/823,215, filed Nov. 27, 2017; 6 pages.
Notice of Allowance dated Jun. 26, 2018; U.S. Appl. No. 15/823,215, filed Nov. 27, 2017; 16 pages.
PCT International Search Report; Application No. PCT/US2014/011521; dated Sep. 4, 2014; 4 pages.
PCT Written Opinion of the International Searching Authority; Application No. PCT/US2014/011521; dated Sep. 4, 2014; 6 pages.
Chinese Office Action; Application No. 201480014536.7; dated Apr. 28, 2016; 10 pages.
Chinese Office Action; Application No. 201480014536.7; dated Aug. 3, 2017; 10 pages.
Chinese Office Action; Application No. 201480014536.7; dated Mar. 19, 2018; 9 pages.
European Examination Report; Application No. 14716041.0; dated Mar. 7, 2017; 6 pages.
European Examination Report; Application No. 14716041.0; dated Mar. 26, 2018; 6 pages.
European Examination Report; Application No. 14716041.0; dated Feb. 7, 2019; 5 pages.
Chinese Office Action; Application No. 201480014536.7; dated Mar. 13, 2019; 11 pages.

* cited by examiner

HOMOGENIZATION SYSTEM FOR AN LED LUMINAIRE

CROSS-REFERENCE TO RELATED APPLICATIONS

This application is a continuation of U.S. patent application Ser. No. 15/823,215 filed Nov. 27, 2017 by Pavel Jurik, et al. entitled, "Homogenization System for an LED Luminaire", which is a continuation of U.S. Pat. No. 9,885,461 entitled, "Homogenization System for an LED Luminaire", which is a continuation in part of U.S. patent application Ser. No. 14/155,178 filed on Jan. 14, 2014, which claims priority to U.S. Provisional Application No. 61/752,006 filed on Jan. 14, 2013, all of which are incorporated by reference herein as if reproduced in their entirety.

FIELD OF DISCLOSURE

The present disclosure generally relates to a method for controlling the light output from an array of LEDs when used in a light beam producing luminaire, specifically to a method relating to combining multiple colors of LED into a single homogenized light beam.

BACKGROUND

High power LEDs are commonly used in luminaires, for example, in the architectural lighting industry in stores, offices, and businesses as well as in the entertainment industry in theatres, television studios, concerts, theme parks, night clubs, and other venues. These LEDs are also being utilized in automated lighting luminaires with automated and remotely controllable functionality. For color control it is common to use an array of LEDs of different colors. For example, a common configuration is to use a mix of red, green, and blue LEDs. This configuration allows the user to create the color they desire by mixing appropriate levels of the three colors. For example, illuminating the red and green LEDs while leaving the blue extinguished will result in an output that appears yellow. Similarly, red and blue will result in magenta, and blue and green will result in cyan. By judicious control of these three controls the user may achieve nearly any color they desire. More than three colors may also be used and it is well known to add amber, cyan, or royal blue LEDs to the red, green, and blue to enhance the color mixing and improve the gamut of colors available.

The differently colored LEDs may be arranged in an array in the luminaire where there is physical separation between each LED. This separation, coupled with differences in die size and placement for each color, may affect the spread of the individual colors and results in objectionable spill light and color fringing of the combined mixed color output beam. It is common to use a lens or other optical device in front of each LED to control the beam shape and angle of the output beam; however, these optical devices commonly have differing effect for different colors and color fringing or other aberrations may be visible in the output beam. It is also known to use dichroic reflecting filters to combine three single colors of LED into a beam. However, these systems do not provide means for mixing more than three colors of LEDs. It would be advantageous to have a system which provides good homogenization of more than three colors of LEDs into a single output light beam.

There is a need for a homogenization system for an LED array based luminaire which provides improvements in homogenization for LED systems comprising four or more different colors of LEDs.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION

Embodiments of an improved LED light homogenizer are illustrated in the Figures, like numerals being used to refer to like and corresponding parts of the various drawings.

The present disclosure generally relates to a method for controlling the light output from an array of LEDs when used in a light beam producing luminaire, specifically to a method relating to providing improvements in homogenization for LED systems comprising different colors of LEDs.

Figure 1:
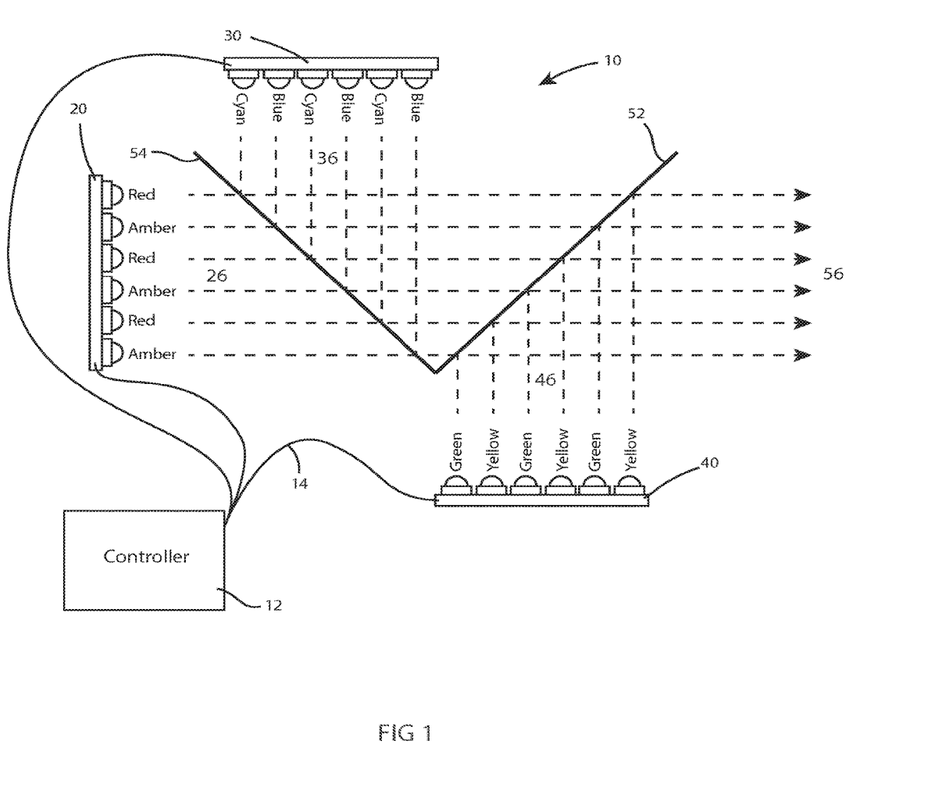
FIG. 1 illustrates an embodiment of an improved LED light homogenizer.

FIG. 1 illustrates a schematic of an embodiment of an improved LED light homogenizer 10. A first LED array 20 may comprise an arrangement of LED's with discrete longer wavelength peaks such as red and amber LEDs. A second LED array 30 may comprise an arrangement of LED's with discrete short wavelength peaks such as blue and cyan LEDs. A third LED array 40 may comprise an arrangement of LED's with discrete midrange wavelength peaks such as yellow and green LEDs. Each array, 20, 30, and 40, may have the associated LEDs arranged in a layout such that the colors are well distributed and mixed across the array. In the embodiment shown, the LED arrays 20, 30, and 40 are controlled by a controller 12, electrically connected by wire 14 to the LED arrays 20, 30, and 40.

In some embodiments, there are a limited number of discrete peak LEDs in an array. For example, in the embodiment illustrated there are two discrete peak types for the three arrays employed: the long wavelength first LED array 20 has red and amber, the short wavelength second LED array 30 has blue and cyan, and the third midrange LED array 40 has green and yellow. In some embodiments all of the LEDs from an array are controlled by the controller 12 as a unit. In other embodiments, the lights of distinct colors are controlled independent of the other distinct colors. For example, in the long bandwidth array, the red LEDs are controlled as a separate color than the amber LEDs.

The red and amber light 26 from first LED array 20 impinges on the rear of dichroic filter 54. Dichroic filter 54 is designed such that it will allow light in red and amber wavelengths to pass through unaffected. In the embodiment illustrated, dichroic filter 54 may be designed as a long pass filter generally letting through wavelengths longer than a certain cut off. In alternative embodiments, this filter may be designed to be a band pass filter that lets discrete long wavelength light through where the band passes match the peak wavelengths of the discrete LEDs in the long wavelength first LED array 20. Lights of other wavelengths are not allowed to pass and are reflected out of the light beam.

The red and amber light transmitted through dichroic filter 54 from first LED array 20 next impinges on the rear of dichroic filter 52. Dichroic filter 52 is also designed such that it will allow light in red and amber wavelengths to pass through unaffected. The characteristics of alternative embodiments of dichroic filter 52 are further discussed below. But, with respect to the red and amber light, dichroic filter 52 acts either a long pass or a band pass for the longer red and amber wavelengths. Thus, the red and amber light 26 from first LED array 20 will exit in light beam 56.

The blue and cyan light 36 from second LED array 30 impinges on the front of dichroic filter 54. As previously described, dichroic filter 54 is designed as a long pass filter (or discrete long bands pass) and therefore it will reflect light in shorter blue and cyan wavelengths.

The blue and cyan light from second LED array 30 impinges on the rear of dichroic filter 52. As previously described, dichroic filter 52 allows passage of long wavelengths. Dichroic filter 52 is also designed to allow passage of short wavelengths such that it will allow light in blue and cyan wavelengths to pass through unaffected. Thus, the blue and cyan light 36 from second LED array 30 will also exit in light beam 56, superimposed on any red and amber light from first LED array 20.

The green and yellow light 46 from third LED array 40 impinges on the front of dichroic filter 52. Dichroic filter 52 is designed such that it will reflect light in the midrange of the color spectrum, thus reflecting rather than transmitting green and yellow wavelengths. Thus, the green and yellow light 46 from third LED array 40 will also exit in light beam 56, superimposed on any red and amber light from first LED array 20 and any blue and cyan light from second LED array 30.

Thus, by selective transmission and reflection by dichroic filters 52 and 54, all colors of LED: red, amber, blue, cyan, green, and yellow, are homogenized and superimposed into a single light beam 56.

The example shown here utilizes six colors of LED: red, amber, blue, cyan, green, and yellow, however, the disclosure is not so limited and other mixes of LED colors are possible without departing from the spirit of the disclosure. For example, a royal blue LED could be utilized instead of, or as well as, the cyan LED on second LED array 30. For each choice of LEDs on the arrays a corresponding design change must be considered for the dichroic filters so that they reflect and/or transmit the appropriate light wavelengths.

Figure 2:
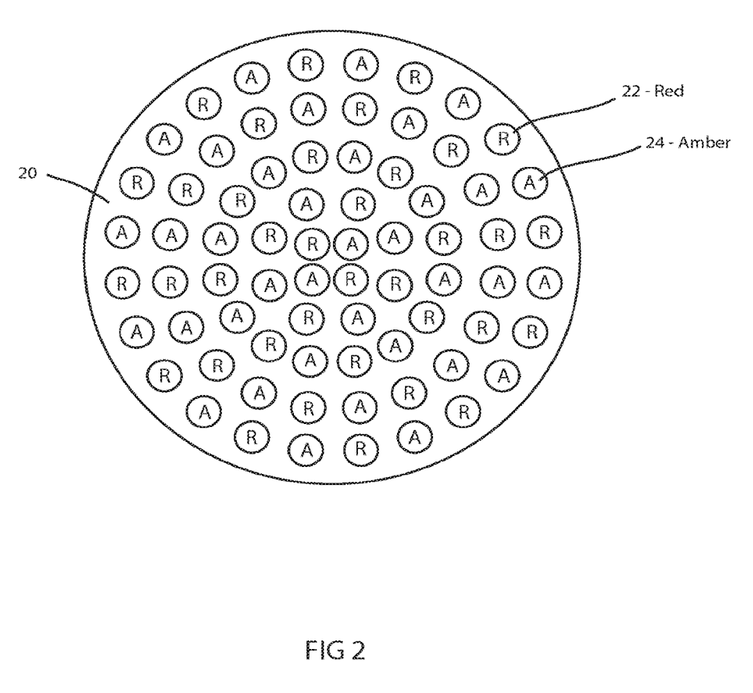
FIG. 2 illustrates an embodiment of a first LED array of the LED light homogenizer illustrated in FIG. 1.

FIG. 2 illustrates an embodiment of a first LED array 20 of the LED light homogenizer illustrated in FIG. 1. In this embodiment, a plurality of red LEDs 22 and a plurality of amber LEDs 24 are distributed across first LED array 20. The arrangement and numbers of each of the red and amber LEDs may be chosen such as to optimize the mix and balance of the two colors. For example, if the amber LEDs are twice as powerful as the red LEDs, it may only be necessary to have half the number of amber as red. In that instance, the array would comprise two-thirds red LEDs 22 and one-third amber LEDs 24. The first LED array 20 illustrated is circular, however the disclosure is not so limited and the first LED array 20 may be any shape chosen from, but not limited to, circular, square, rectangular, hexagonal, or octagonal.

Figure 3:
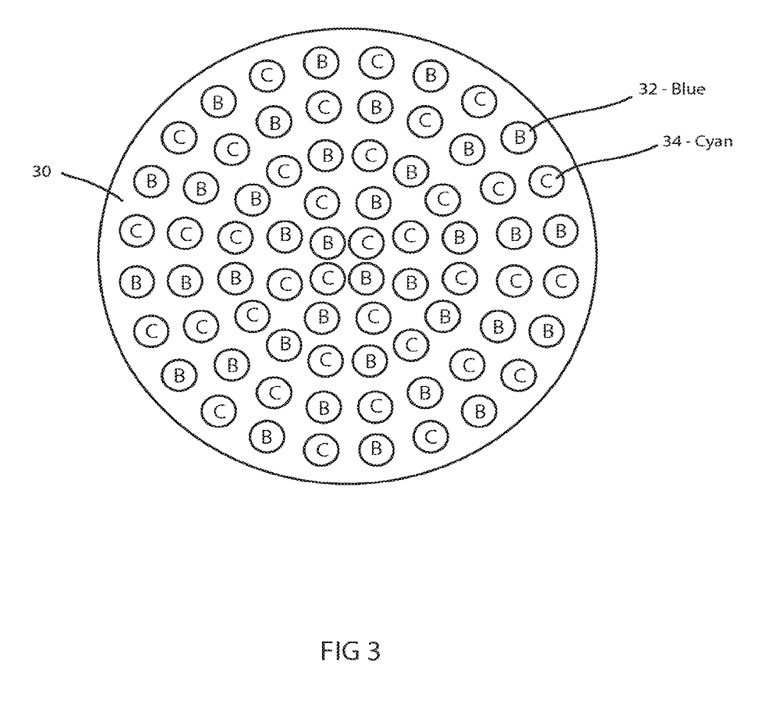
FIG. 3 illustrates an embodiment of a second LED array of the LED light homogenizer illustrated in FIG. 1.

FIG. 3 illustrates an embodiment of a second LED array 30 of the LED light homogenizer illustrated in FIG. 1. In this embodiment, a plurality of blue LEDs 32 and a plurality of cyan LEDs 34 are distributed across second LED array 30. The arrangement and numbers of each of the blue and cyan LEDs may be chosen such as to optimize the mix and balance of the two colors. The second LED array 30 illustrated is circular, however the disclosure is not so limited and the second LED array 30 may be any shape chosen from, but not limited to, circular, square, rectangular, hexagonal, or octagonal.

Figure 4:
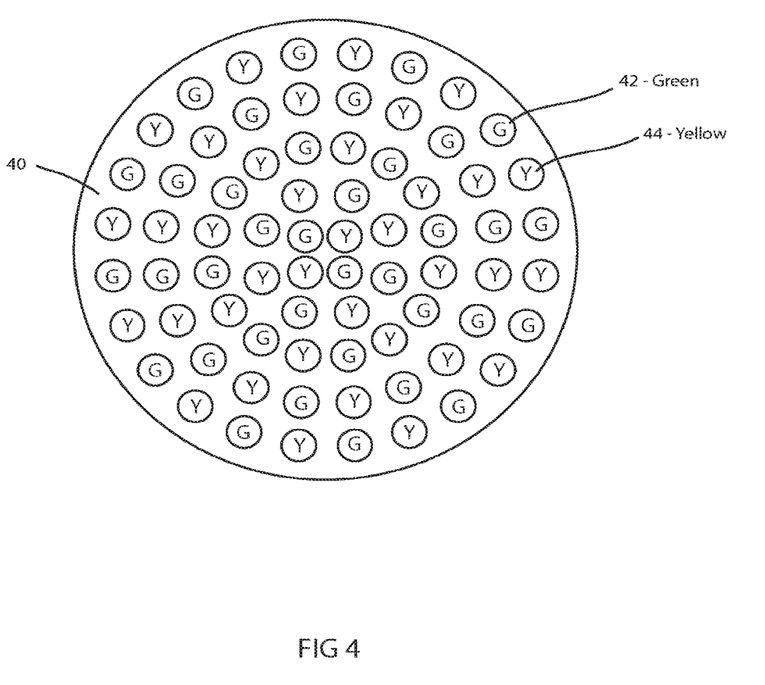
FIG. 4 illustrates an embodiment of a third LED array of the LED light homogenizer illustrated in FIG. 1.

FIG. 4 illustrates an embodiment of a third LED array 40 of the LED light homogenizer illustrated in FIG. 1. In this embodiment, a plurality of green LEDs 42 and a plurality of yellow LEDs 44 are distributed across third LED array 40. The arrangement and numbers of each of the green and yellow LEDs may be chosen such as to optimize the mix and balance of the two colors. The third LED array 40 illustrated is circular, however the disclosure is not so limited and third LED array 40 may be any shape chosen from, but not limited to, circular, square, rectangular, hexagonal, or octagonal.

Figure 5A:
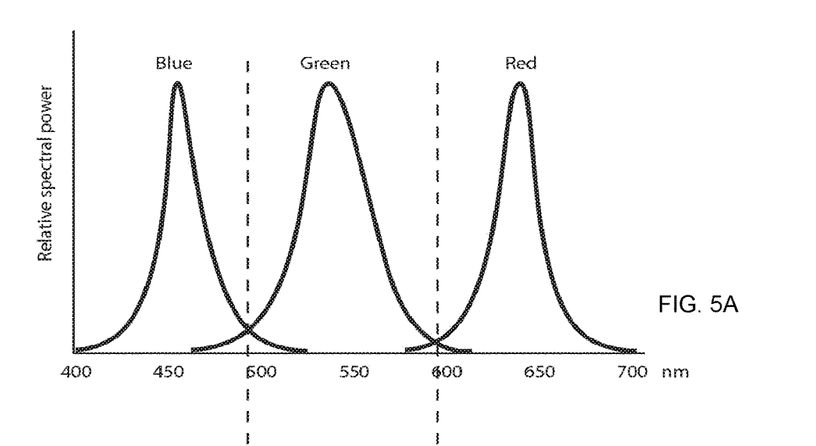
FIGS. 5A-5C illustrate the prior art use of transmissive/reflective dichroic filters in both homogenizers and beam splitters.
Figure 5B:
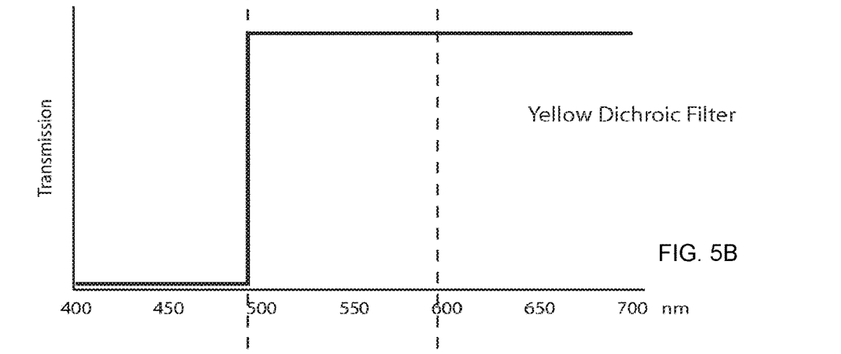
Figure 5C:
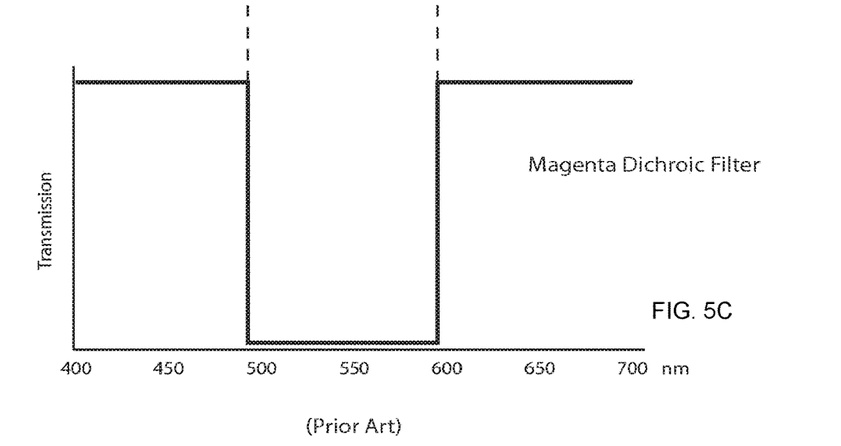

FIGS. 5A-5C illustrate the prior art use of transmissive/reflective dichroic filters in both homogenizers and beam splitters. Such arrangements of dichroic filters are commonly used to both combine light and to split light for video cameras into their red, green, and blue components. FIG. 5A shows the relative spectral power distributions (SPD) of the light emitted by red, green, and blue LEDs with discrete wavelength peaks. It can be seen that the blue LED peaks at around 450 nanometers ("nm"), the green at 550 nm, and the red at 650 nm. The yellow dichroic filter illustrated in FIG. 5B has a filter characteristic such that it allows the red, 650 nm, and green, 550 nm, light to pass unimpeded, while reflecting the blue, 450 nm. Such a filter would appear yellow to the eye. Similarly, the magenta dichroic filter illustrated in FIG. 5C has a filter characteristic such that it allows the red, 650 nm, and blue, 450 nm, light to pass unimpeded, while reflecting the green, 550 nm. Such a filter would appear magenta to the eye. These two filters may be used in a layout similar to that shown in FIG. 1 as dichroic filters 52 and 54 so as to combine the output of red, green, and blue LEDs. However, these filters would not allow us to add in amber, cyan, and yellow LEDs.

Figure 6A:
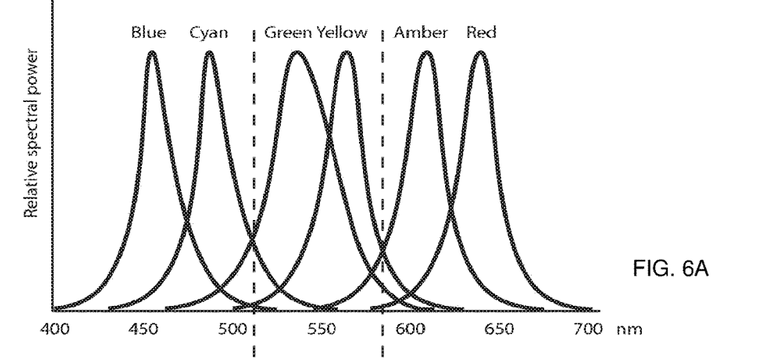
FIGS. 6A-6C illustrate the improved use of transmissive/reflective dichroic filters in the embodiment of the LED light homogenizer illustrated in FIG. 1 and/or FIG. 8.
Figure 6B:
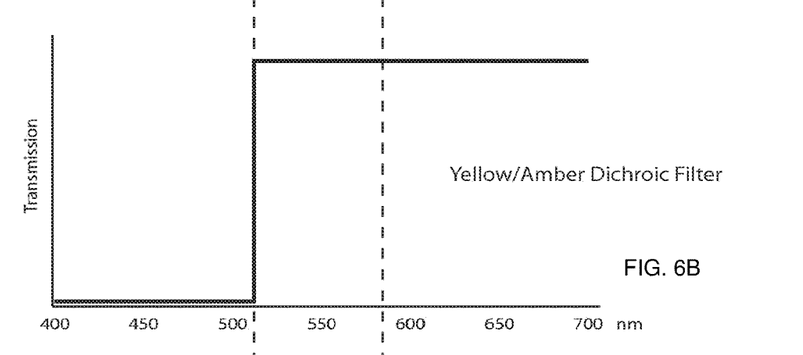
Figure 6C:
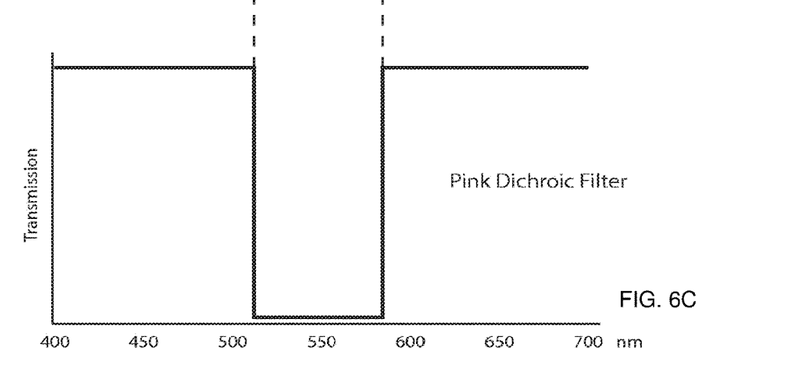
Figure 8:
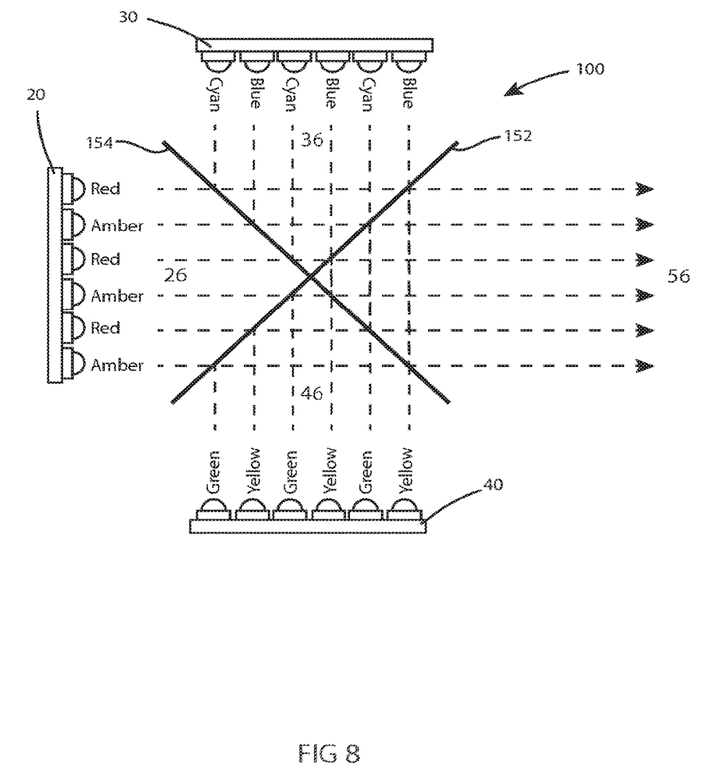
FIG. 8 illustrates an alternative embodiment of an improved LED light homogenizer.

FIGS. 6A-6C illustrate the improved use of transmissive/reflective dichroic filters in the embodiment of the LED light homogenizer illustrated in FIG. 1 and/or FIG. 8. FIG. 6A shows the relative spectral power distributions (SPD) of the light emitted by an embodiment of the disclosure utilizing red, amber, green, yellow, blue, and cyan LEDs. It can be seen that the LEDs have discrete wavelength peaks with blue LED peak at around 450 nm, the cyan at 475 nm, the green at 550 nm, the yellow at 575 nm, the amber at 625 nm, and the red at 650 nm. The yellow/amber dichroic filter illustrated in FIG. 6B has a filter characteristic such that it allows the red 650 nm, amber, 625 nm, yellow 575 nm, and green 550 nm, light to pass unimpeded, while reflecting the blue 450 nm and cyan 475 nm. Such a filter would appear yellow/amber to the eye. Similarly, the pink dichroic filter illustrated in FIG. 6C has a filter characteristic such that it allows the red, 650 nm, amber 625 nm, cyan 475 nm, and blue 450 nm, light to pass unimpeded, while reflecting the yellow 575 nm, and green, 550 nm. Such a filter would appear pink to the eye. These two filters may be used in FIG. 1 as dichroic filters 52 and 54 so as to combine the output of red, amber, green, yellow, blue, and cyan LEDs.

Figure 7A:
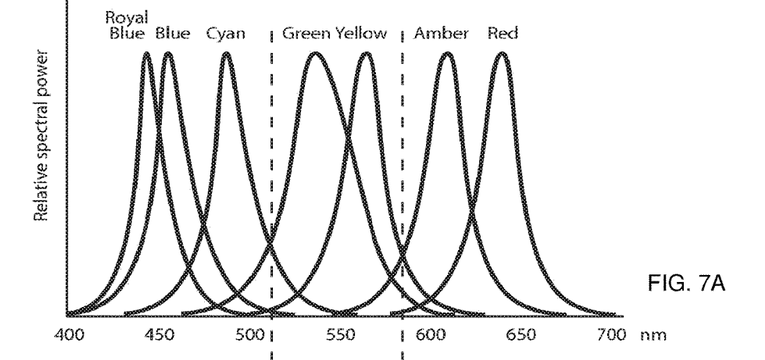
FIGS. 7A-7C illustrate an alternative embodiment of the improved light homogenizer.
Figure 7B:
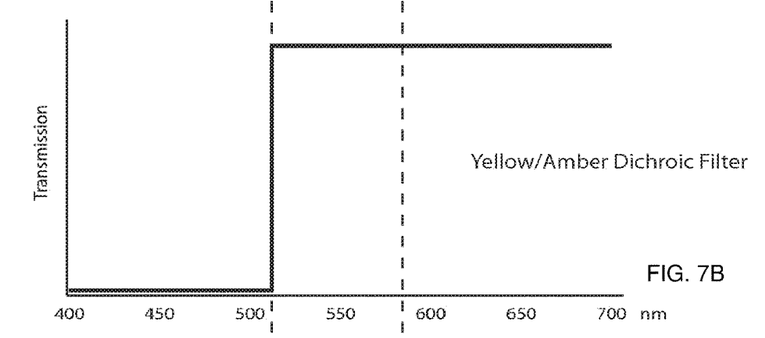
Figure 7C:
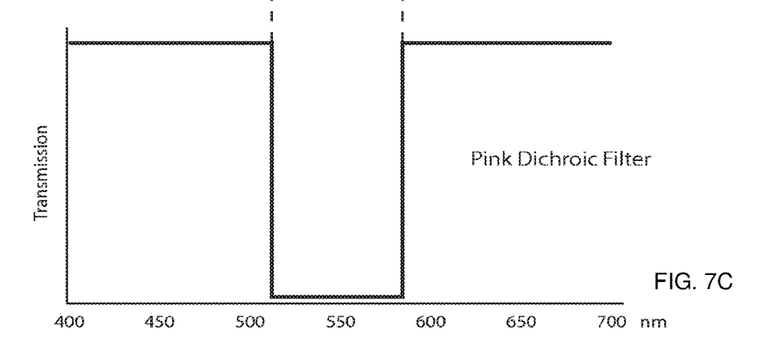

FIGS. 7A-7C illustrate an alternative embodiment of the improved light homogenizer. FIG. 7A illustrates an alternative embodiment extended to include further colors of LEDs. In this embodiment a royal blue LED of wavelength 440 nm has been added to second LED array 30. The appropriate filter characteristics of the dichroic filters to utilize this color are shown in FIGS. 7B and 7C.

FIG. 8 illustrates an alternative embodiment of an improved LED light homogenizer 100. In the embodiment shown, dichroic filters 152 and 154 have been arranged in a crossed arrangement as opposed to the serial arrangement shown in FIG. 1. This layout reduces the overall length of the assembly.

Figure 9:
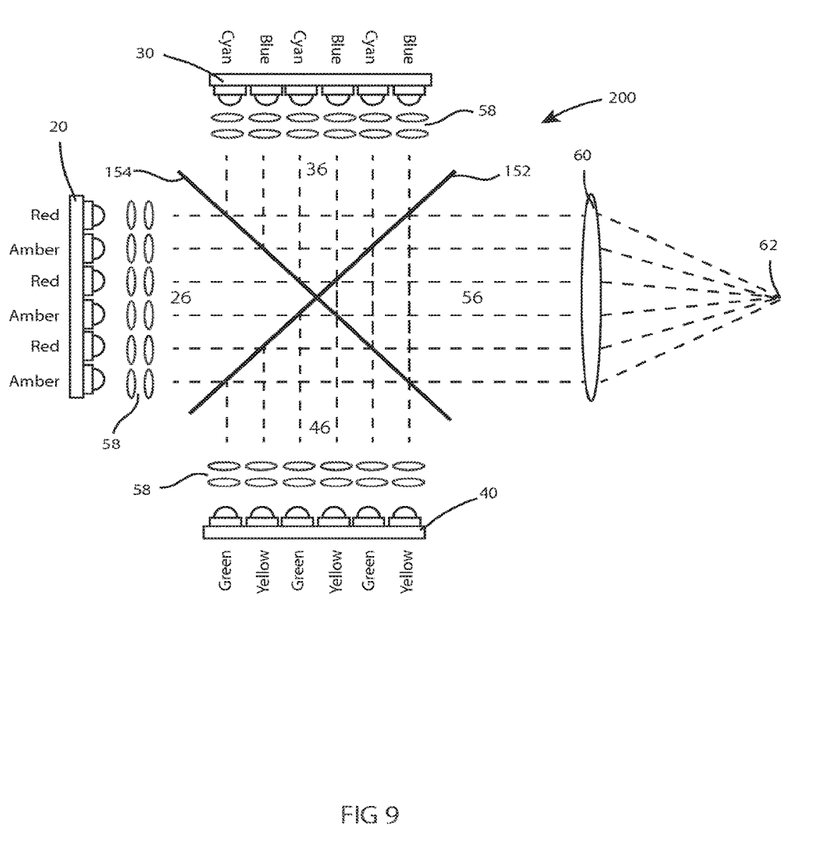
FIG. 9 illustrates a further embodiment of an improved LED light homogenizer.

The embodiments illustrated in FIG. 1, FIG. 8, and FIG. 9 show the red and amber emitters of first LED array 20 at the rear with blue and cyan of the second LED array 30 on one side and yellow and green of the third LED array 40 on the other, however it should be understood that this layout is a single example of possible arrangements of the light emitters of the disclosure and that in further embodiments, the LED emitters are arranged differently. For example, in alternative embodiments, the green and yellow LEDs of the third LED array 40 may be located at the rear where the red and amber LEDs of the first LED array 20 are illustrated in the Figures. Of course the configuration of the dichroic filters/mirrors 52, 54 and/or 152, 154 will have to match the configuration of the LEDs so that the desired colors pass light beam 56 in the case of the rear LED array and reflect in the direction of light beam 56 in the case of the side LED arrays.

FIG. 9 illustrates a further embodiment of an improved LED light homogenizer 200 and adds controlling optics to the system. Each LED may have a secondary optical system 58 which serves to collimate and direct the light beam through the dichroic filters 152 and 154. The system may also have focusing and homogenizing optics 60 which may focus the exiting light beam 56 to a focal point 62. Focusing and homogenizing optics 60 may include optical elements selected from, but not restricted to, optical diffuser, holographic diffuser, non-Gaussian diffuser, integrating rod of any cross section, integrating tunnel of any cross section, or other optical means of homogenizing or mixing light as is well known in the art. Focusing and homogenizing optics 60 may further include optical elements selected from, but not restricted to, a single positive or negative lens, or multiple lenses arranged in one or more optical groups. Such an optical system may have movable elements such that the focal length of the focusing and homogenizing optics 60 is adjustable. The focusing and homogenizing optical system 60 may also include field stops, apertures, gates, gobos, and other optical devices well known in the art.

The control of the filter characteristics of dichroic filters 52 and 54 is critical for the disclosure. The filters must be carefully manufactured such that their pass bands match the wavelengths of the LEDs utilized. The wavelength responses of the filters shown in FIG. 6 are shown very simplistically. In practice the response is not nearly so square or abrupt. Additionally, the response is shown generically so that it would work for both the embodiments illustrated in FIG. 1 as well as the embodiments illustrated in FIG. 8 and FIG. 9. The generalized response shows a cut-off length at around 500 nm for the yellow dichroic filter which corresponds with dichroic filter 54 in FIGS. 1 and 154 in FIG. 8 and FIG. 9. However, in other embodiments the cut-off length could be designed to be closer to 600 nm for dichroic filter 54 in FIG. 1.

By way of the example embodiments of FIG. 1, dichroic filter 54 should be designed to both: (1) maximize the reflection of light at the LED peaks at around 450 nm (blue) and around 475 nm (cyan); and (2) maximize the transmission of light at LED peaks at around 625 nm (amber) and around 650 nm (red). Dichroic filter 52 should be designed to both: (1) maximize the reflection of light at the LED peaks at around 550 nm (green) and around 575 nm (yellow); and (2) maximize the transmission of light at LED peaks around 450 nm (blue), around 475 nm (cyan), around 625 nm (amber), and around 650 nm (red).

By way of the example embodiments of FIG. 8, dichroic filter 154 should be designed to both: (1) maximize the reflection of light at the LED peaks at around 450 nm (blue) and around 475 nm (cyan); and (2) maximize the transmission of light at LED peaks at around 550 nm (green), around 575 nm (yellow), around 625 nm (amber), and around 650 nm (red). Dichroic filter 152 should be designed to both: (1) maximize the reflection of light at the LED peaks at around 550 nm (green) and around 575 nm (yellow); and (2) maximize the transmission of light at LED peaks around 450 nm (blue), around 475 nm (cyan), around 625 nm (amber), and around 650 nm (red).

By way of the example embodiments of FIG. 1 with the LED peaks of FIG. 7, dichroic filter 54 should be designed to both: (1) maximize the reflection of light at the LED peaks at around 440 nm (royal blue), around 450 nm (blue), and around 475 nm (cyan); and (2) maximize the transmission of light at LED peaks at around 625 nm (amber) and around 650 nm (red). Dichroic filter 52 should be designed to both: (1) maximize the reflection of light at the LED peaks at around 550 nm (green) and around 575 nm (yellow); and (2) maximize the transmission of light at LED peaks around 440 nm (royal blue), around 450 nm (blue), around 475 nm (cyan), around 625 nm (amber), and around 650 nm (red).

By way of the example embodiments of FIG. 8 with the LED peaks of FIG. 7, dichroic filter 154 should be designed to both: (1) maximize the reflection of light at the LED peaks at around 440 nm (royal blue), around 450 nm (blue), and around 475 nm (cyan); and (2) maximize the transmission of light at LED peaks at around 550 nm (green), around 575 nm (yellow), around 625 nm (amber), and around 650 nm (red). Dichroic filter 152 should be designed to both: (1) maximize the reflection of light at the LED peaks at around 550 nm (green) and around 575 nm (yellow); and (2) maximize the transmission of light at LED peaks at around 440 nm (royal blue), around 450 nm (blue), around 475 nm (cyan), around 625 nm (amber), and around 650 nm (red).

It should be appreciated that in their preferred modes of each of the embodiments described herein, the LED arrays 20, 30, and 40 are controlled by a controller 12 which is connected to the arrays. The connection may be electrical as illustrated in FIG. 1 or may be by wireless communication means for controlling the LEDs capacity to output light. In a preferred embodiment, the control of the colors as defined by their peak wavelength are controlled independent of the other colors similarly defined and at least one of multiple arrays has multiple such defined colors each independently controllable.

Figure 10:
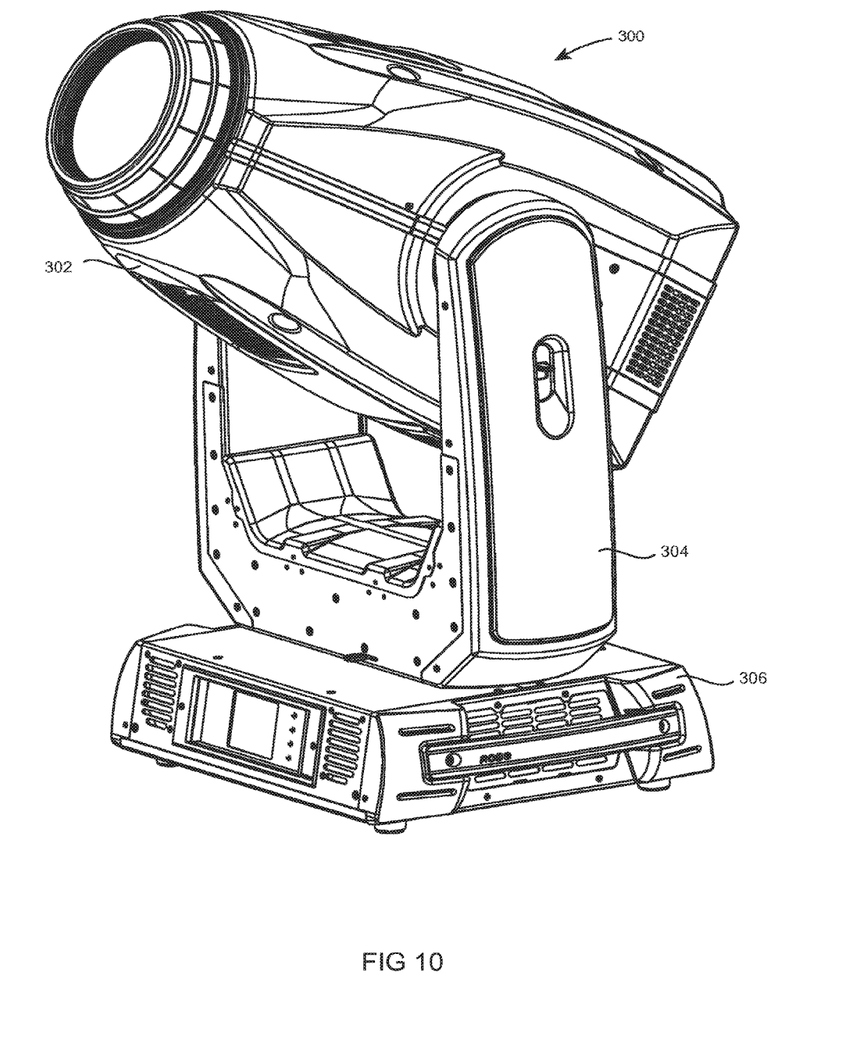
FIG. 10 illustrates an alternative embodiment of an automated luminaire, including an improved LED light homogenizer.

FIG. 10 illustrates an alternative embodiment of an automated luminaire, including an improved LED light homogenizer. Luminaires with automated and remotely controllable functionality are well known in the entertainment and architectural lighting markets. Such products are commonly used in theatres, television studios, concerts, theme parks, nightclubs and other venues. A typical product will provide control over the pan and tilt functions of the luminaire allowing the operator to remotely control the direction the luminaire is pointing and thus the position of the light beam on the stage or other space in which it is operational. Typically this position control is done via control of the luminaire's position in two orthogonal rotational axes commonly referred to as pan and tilt. Many products provide control over other parameters such as the intensity, color, focus, beam size, beam shape and beam pattern. The beam pattern is often provided by a stencil or slide called a gobo which may be a steel, aluminum, or etched glass pattern. The products manufactured by Robe Show Lighting such as the ColorSpot 700E are typical of the art. Automated luminaire 300 may comprise top box 306, yoke 304, and head 302. In this case, the head 302 contains an embodiment of the LED light homogenizer as the light source of the light engine (not shown), but further shown and described below, as well as prior art optical devices such as gobos, shutters, iris, prisms, frost, animation wheel, and other optical devices as is well known in the art. In alternative embodiments, the majority of the optical engine is stationary and the panning and/or tilting positioning of the light beam is accomplished by a gimbaled mirror redirecting the light beam proximate to output end of the light engine. Such embodiment is not shown, but is well known in the art.

Figure 11:
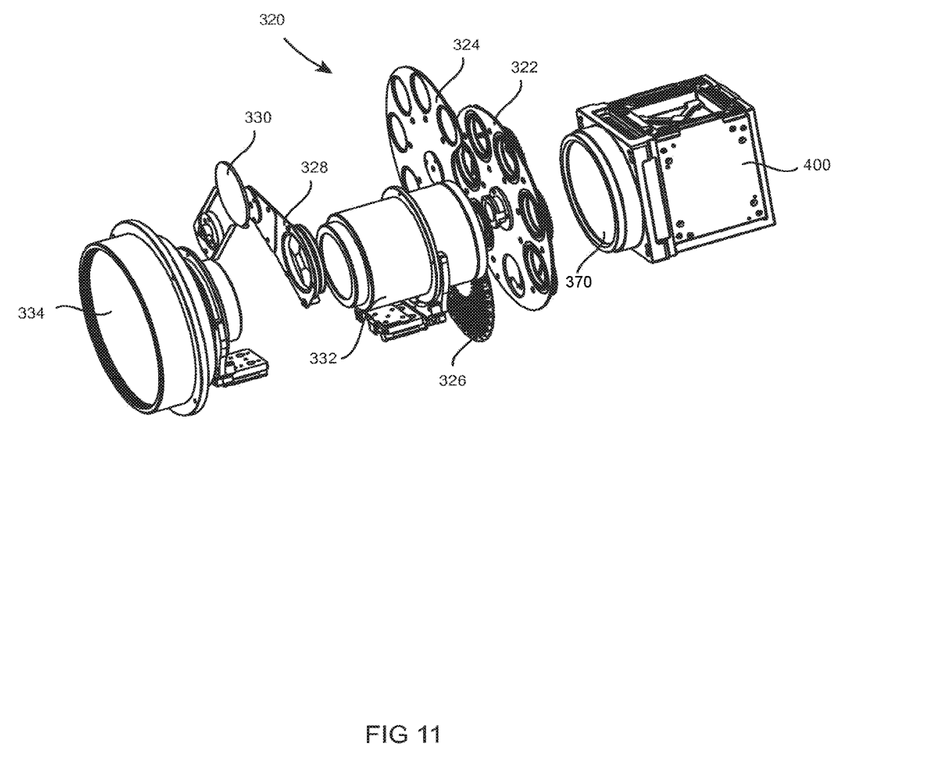
FIG. 11 illustrates the optical engine of an automated luminaire including the improved LED light homogenizer; and, FIG. 12 illustrates a further embodiment of an LED light homogenizer.

FIG. 11 illustrates the optical engine 320 of an automated luminaire 300 shown in FIG. 10 including the improved LED light homogenizer. Light source 400 is an embodiment of the improved light homogenizer. Homogenized light exits light source 400 through source exit optic 370. In the optical engine 320, the light beam then passes through a rotating gobo wheel 322, a stationary gobo wheel 324, an animation wheel 326, a lens system 332, a selectable rotating prism system 328, and a selectable frost system 330, before exiting through final output lens 334. It should be understood that the layout, number, and description of optical devices shown in FIG. 11 is illustrative and that the application of the disclosure is not so specifically constrained. In practice, any number, layout, and type of optical devices may be used in automated luminaire 300 as is well known in the art.

Figure 12:
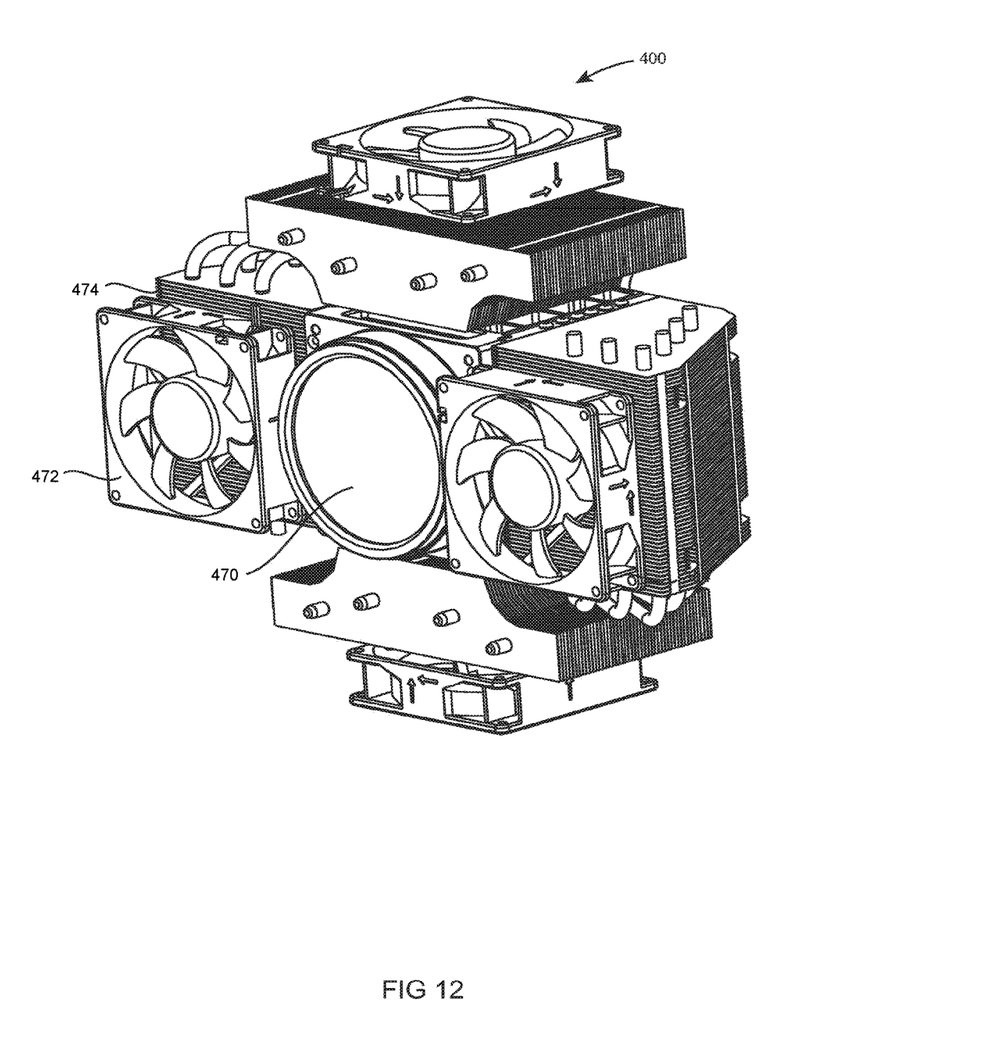

FIG. 12 illustrates a further embodiment of an LED light homogenizer, which may be as described in FIG. 9 and used in automated luminaire 300, shown in FIG. 10. Light source 400 comprises an embodiment of the improved light homogenizer along with cooling system(s) 472 and 474. Homogenized light exits light source 400 through exit optic 470.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions, and alterations can be made hereto without departing from the spirit and scope of the disclosure.

What is claimed is:

1. A luminaire comprising:
a head;
a positioning mechanism, coupled to the head and configured to rotate the head in at least one axis; and
a light source, coupled to the head and configured to emit a light beam, the light source comprising:
a first array of light emitting diodes (LEDs), comprising first and second sets of LEDs, the first and second sets of LEDs producing light of first and second colors, respectively;
a second array of LEDs, comprising third and fourth sets of LEDs, the third and fourth sets of LEDs producing light of third and fourth colors, respectively;
a third array of LEDs, comprising a fifth set of LEDs producing light of a fifth color;
a first dichroic filter, configured to combine light from the first array of LEDs with light from the second array of LEDs, wherein filter characteristics of the first dichroic filter are selected to maximize transmission of the light from the first and the third arrays of LEDs and to maximize reflection of the light from the second array of LEDs; and
a second dichroic filter, configured to combine light from the first array of LEDs with light from the third array of LEDs, wherein filter characteristics of the second dichroic filter are selected to maximize transmission of the light from the first and second arrays of LEDs and to maximize reflection of the light from the third array of LEDs,
wherein the light beam emitted by the light source comprises the light combined by the first dichroic filter and the light combined by the second dichroic filter.

2. The luminaire of claim 1, wherein LEDs of the first and second sets of LEDs are physically interspersed in the first array of LEDs or LEDs of the third and fourth sets of LEDs are physically interspersed in the second array of LEDs.

3. The luminaire of claim 1, further comprising a controller electronically coupled to the first through fifth sets of LEDs and configured to individually control a brightness of at least one of the first through fifth sets of LEDs.

4. The luminaire of claim 1, further comprising first, second, and third collimating optical systems each optically coupled with an associated one of the first, second, and third arrays of LEDs, wherein each collimating optical system is configured to collimate the light from the LEDs of the associated array of LEDs.

5. The luminaire of claim 1, wherein the at least one axis is a first axis and the positioning mechanism is further configured to rotate the head in a second axis, the second axis being orthogonal to the first axis.

6. The luminaire of claim 1, further comprising a cooling system thermally coupled to the light source and configured to remove heat generated by the light source.

7. The luminaire of claim 1, further comprising a focusing optical system optically coupled to the light source, wherein the focusing optical system is configured to focus to a focal point the light beam emitted by the light source.

8. The luminaire of claim 7, wherein the focusing optical system is further configured to homogenize the light beam emitted by the light source.

9. The luminaire of claim 7, wherein the focusing optical system comprises moveable elements configured to adjust a focal length of the focusing optical system.

10. The luminaire of claim 7, wherein the luminaire further comprises an optical device system optically coupled to the light source, the optical device system comprising one or more of a field stop, an aperture, a gate, a rotating gobo wheel, a stationary gobo wheel, an animation wheel, a lens system, a selectable rotating prism system, and a selectable frost system.

11. A luminaire comprising:
a head;
a positioning mechanism, coupled to the head and configured to rotate the head in at least one axis; and
a light source, coupled to the head and configured to emit a light beam, the light source comprising:
a first array of light emitting diodes (LEDs), comprising first and second sets of LEDs, the first and second sets of LEDs producing light of first and second colors, respectively;
a second array of LEDs, comprising a third set of LEDs producing light of a third color;
a third array of LEDs, comprising a fourth set of LEDs producing light of a fourth color;
a first dichroic filter, configured to combine light from the first array of LEDs with light from the second array of LEDs, wherein filter characteristics of the first dichroic filter are selected to maximize transmission of the light from the first and the third arrays of LEDs and to maximize reflection of the light from the second array of LEDs; and
a second dichroic filter, configured to combine light from the first array of LEDs with light from the third array of LEDs, wherein filter characteristics of the second dichroic filter are selected to maximize transmission of the light from the first and second arrays of LEDs and to maximize reflection of the light from the third array of LEDs,
wherein the light beam emitted by the light source comprises the light combined by the first dichroic filter and the light combined by the second dichroic filter.

12. The luminaire of claim 11, wherein LEDs of the first and second sets of LEDs are physically interspersed in the first array of LEDs.

13. The luminaire of claim 11, further comprising a controller electronically coupled to the first through fourth sets of LEDs and configured to individually control a brightness of at least one of the first through fourth sets of LEDs.

14. The luminaire of claim 11, further comprising first, second, and third collimating optical systems each optically coupled with an associated one of the first through third arrays of LEDs, wherein each collimating optical system is configured to collimate the light from the LEDs of the associated array of LEDs.

15. The luminaire of claim 11, wherein the at least one axis is a first axis and the positioning mechanism is further configured to rotate the head in a second axis, the second axis being orthogonal to the first axis.

16. The luminaire of claim 11, further comprising a cooling system thermally coupled to the light source and configured to remove heat generated by the light source.

17. The luminaire of claim 11, further comprising a focusing optical system optically coupled to the light source, wherein the focusing optical system is configured to focus to a focal point the light beam emitted by the light source.

18. The luminaire of claim 17, wherein the focusing optical system is further configured to homogenize the light beam emitted by the light source.

19. The luminaire of claim 17, wherein the focusing optical system comprises moveable elements configured to adjust a focal length of the focusing optical system.

20. The luminaire of claim 17, wherein the luminaire further comprises an optical device system optically coupled to the light source, the optical device system comprising one or more of a field stop, an aperture, a gate, a rotating gobo wheel, a stationary gobo wheel, an animation wheel, a lens system, a selectable rotating prism system, and a selectable frost system.

* * * * *